United States Patent
Byers et al.

(10) Patent No.: US 10,616,052 B2
(45) Date of Patent: Apr. 7, 2020

(54) COLLABORATIVE HARDWARE PLATFORM MANAGEMENT

(71) Applicant: Cisco Technology, Inc., San Jose, CA (US)

(72) Inventors: Charles Calvin Byers, Wheaton, IL (US); Gonzalo Salgueiro, Raleigh, NC (US); Joseph M. Clarke, Raleigh, NC (US); Carlos M. Morales, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 367 days.

(21) Appl. No.: 15/050,485

(22) Filed: Feb. 23, 2016

(65) Prior Publication Data

US 2017/0244601 A1    Aug. 24, 2017

(51) Int. Cl.
*H04L 12/24*    (2006.01)
*H04L 12/26*    (2006.01)
(Continued)

(52) U.S. Cl.
CPC ........ *H04L 41/0816* (2013.01); *H04L 41/046* (2013.01); *H04L 41/0883* (2013.01); *H04L 43/0817* (2013.01); *H04L 67/12* (2013.01); *H04L 67/34* (2013.01); *H04L 47/10* (2013.01); *H04L 47/70* (2013.01)

(58) Field of Classification Search
CPC ......... H04L 67/34; H04L 63/20; H04L 47/10; H04L 47/70
See application file for complete search history.

(56) References Cited

U.S. PATENT DOCUMENTS

| 8,315,636 B2 | 11/2012 | Moon et al. |
| 8,380,700 B2 | 2/2013 | Moon et al. |

(Continued)

FOREIGN PATENT DOCUMENTS

WO    WO2015/073796    5/2015

OTHER PUBLICATIONS

Chao, Li; Towards Sustainable In-Situ Server Systems in the Big Data Era, in Computer Architecture (ISCA), 2015 ACM/IEEE 42nd Annual International Symposium on , vol., No., pp. 14-25, Jun. 13-17, 2015.

(Continued)

*Primary Examiner* — Barbara B Anyan
(74) *Attorney, Agent, or Firm* — Behmke Innovation Group LLC; James Behmke; Stephen D. LeBarron

(57) ABSTRACT

In one embodiment, a network node device includes a hardware platform including a central processing unit (CPU) complex, a storage medium and an input/output subsystem to provide network processing and transport of data in a network. The CPU complex is operative to receive a plurality of hardware platform management decisions from a plurality of different network nodes in the network, process the received hardware platform management decisions to yield a hardware platform management proposed action, and issue a command to implement the hardware platform management proposed action in the hardware platform. The hardware platform is operative to implement the hardware platform management proposed action. Related apparatus and methods are also described.

18 Claims, 4 Drawing Sheets

(51) Int. Cl.
  *H04L 29/08* (2006.01)
  *H04L 12/801* (2013.01)
  *H04L 12/911* (2013.01)

(56) References Cited

U.S. PATENT DOCUMENTS

| | | | |
|---|---|---|---|
| 8,527,457 B2 | 9/2013 | Moon et al. | |
| 8,554,405 B2 | 10/2013 | Bruzy et al. | |
| 2009/0180377 A1* | 7/2009 | Sullivan | H04L 47/10 370/230 |
| 2012/0278454 A1* | 11/2012 | Stewart | H04L 67/34 709/220 |
| 2014/0297874 A1* | 10/2014 | Matsubara | H04L 47/70 709/226 |
| 2015/0326432 A1* | 11/2015 | Fujie | G06F 9/44505 709/222 |
| 2017/0108906 A1* | 4/2017 | Chandra | G06F 1/28 |
| 2018/0299873 A1* | 10/2018 | Chauvet | H04L 63/20 |

OTHER PUBLICATIONS

Du, Timon C.; Mobile Agents in Distributed Network Management. Commun. ACM 46, 7 (Jul. 2003), 127-132.

Gazis, Vangelis; Components of Fog Computing in an Industrial Internet of Things Context, in Sensing, Communication, and Networking—Workshops (SECON Workshops), 2015 12th Annual IEEE International Conference on , vol., No., pp. 1-6, Jun. 22-25, 2015.

Pigeon Point Systems IPMI Management; World-Class Management Components (2015) Can be seen at: http://www.pigeonpoint.com/.

Preden, Jurgo; Data to Decision: Pushing Situational Information Needs to the Edge of the Network, in Cognitive Methods in Situation Awareness and Decision Support (CogSIMA), 2015 IEEE Int'l Inter-Disciplinary Conference, pp. 158-164, Mar. 9-12, 2015.

Rahmani, Amir-Mohammad; Smart E-Health Gateway: Bringing Intelligence to Internet-of-Things Based Ubiquitous Healthcare Systems, in Consumer Communications and Networking Conference (CCNC), 2015 12th Annual IEEE, vol., No., pp. 826-834, Jan. 9-12, 2015.

Stojmenovic, Ivan; Fog Computing: A Cloud to the Ground Support for Smart Things and Machine-to-Machine Networks, in Telecommunication Networks and Applications Conference (ATNAC), 2014 Australasian , vol., No., pp. 117-122, Nov. 26-28, 2014.

\* cited by examiner

COLLABORATIVE HARDWARE PLATFORM MANAGEMENT

TECHNICAL FIELD

The present disclosure generally relates to dynamic collaborative hardware platform management.

BACKGROUND

Fog computing is a system level architecture that extends the computing, networking and storage capabilities of cloud to the edge of Internet of things (IoT) networks. Fog Computing is a highly virtualized platform that provides compute, storage, and networking services between end devices and traditional Cloud Computing Data Centers, typically but not exclusively, located at the edge of network. A Fog node is a physical network device that implements the Fog network. A Fog node may be connected by a network facility to an IoT device and/or a gateway to the cloud. Many IoT networks run mission critical and even life critical applications.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a network node device including a hardware platform including a central processing unit (CPU) complex, a storage medium and an input/output subsystem to provide network processing and transport of data in a network, the CPU complex being operative to receive a plurality of hardware platform management decisions from a plurality of different network nodes in the network via the input/output subsystem, process the received hardware platform management decisions to yield a hardware platform management proposed action, and issue a command to implement the hardware platform management proposed action in the hardware platform wherein the hardware platform is operative to implement the hardware platform management proposed action.

There is also provided in accordance with another embodiment of the present disclosure a orchestration method including receiving a message, from a network node in a network by an orchestration service, to select a plurality of different network nodes from a selection of network nodes to make a plurality of hardware platform management decisions, selecting the plurality of different network nodes from the selection of network nodes to make the plurality of hardware platform management decisions, and sending a response to the network node, the response listing the plurality of different network nodes.

DETAILED DESCRIPTION

Figure 1:
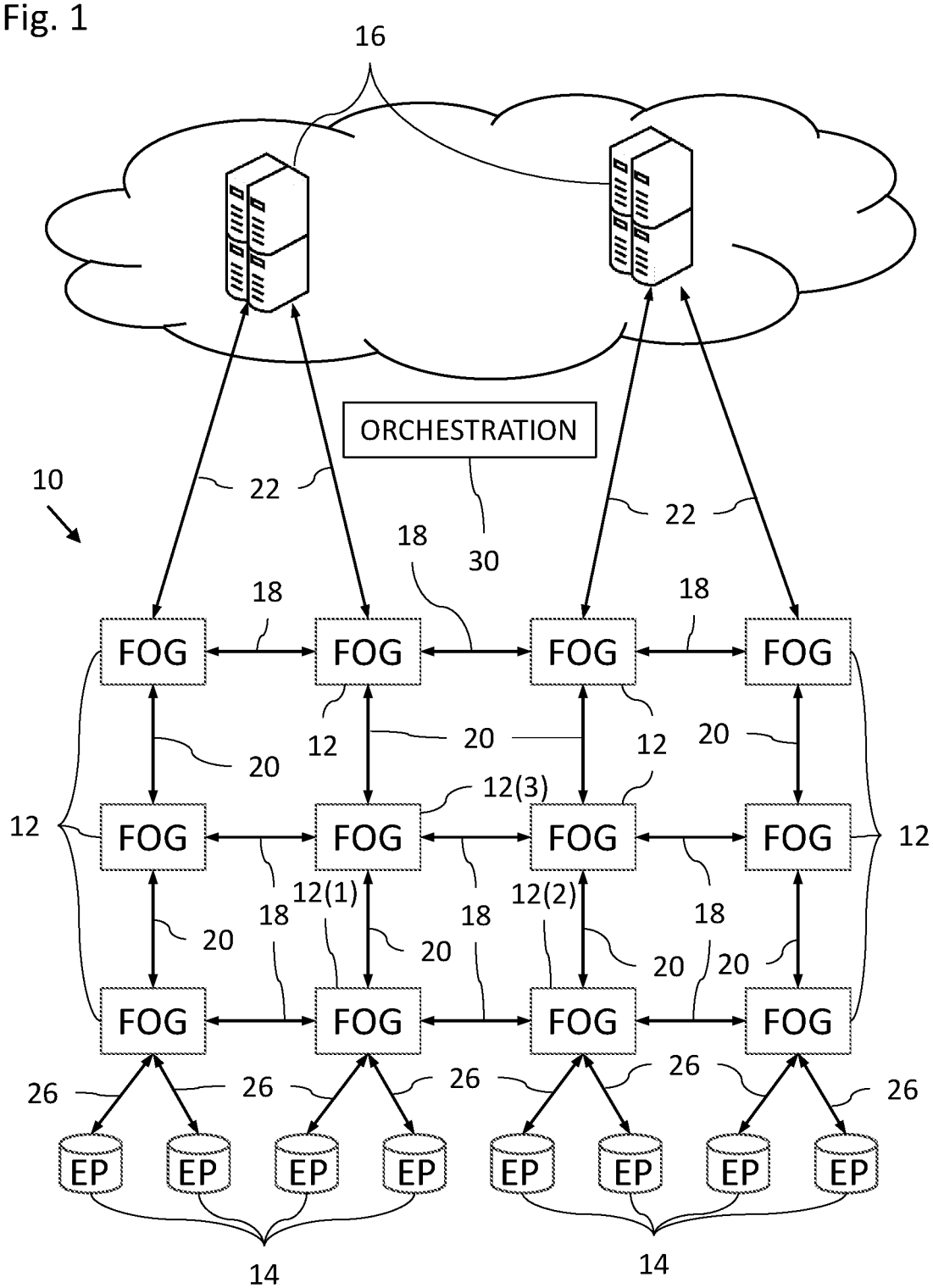
FIG. 1 is a partly pictorial, partly block diagram view of a Fog node network constructed and operative in accordance with an embodiment of the present disclosure.

Reference is now made to FIG. 1, which is a partly pictorial, partly block diagram view of a Fog node network 10 constructed and operative in accordance with an embodiment of the present disclosure. The Fog node network 10 includes a plurality of Fog nodes 12 networked together. Each Fog node 12 is connected to one or more Fog nodes 12 and optionally one or more end-point devices 14. Each end-point device may include sensors, actuators, displays, mobile devices and other Internet of Things (IoT) components. The Fog nodes 12 may be arranged in layers as shown in FIG. 1 extending from a cloud computing environment 16 down to the end-point devices 14. One Fog node 12 may have many data network connections, including east-west (E-W) links 18 to adjacent peer layer Fog nodes 12 in the same layer, and north-south (N-S) links 20 to connect Fog nodes 12 in higher or lower layers in the Fog node network 10 hierarchy, direct Internet backbone connections 22 to the cloud computing environment 16 (cloud layer), and data network connections 26 to the end-point devices 14.

Hardware Platform Management (HPM) functions for the Fog nodes 12 may include significant challenges. In accordance with an embodiment of the present disclosure, HPM of each Fog node 12 is managed to: monitor the state of the hardware platform, for example, based on various internal environment feedback elements such as sensors; control a plurality of actuators; and perform various diagnostic, fault tolerance and routine exercise functions. The state of the hardware platform may include the configuration of the Fog node 12, power supply parameters, cooling temperatures and flows, system errors like chip or link failures or storage capacity problems, environmental alarms like moisture detection and tamper alarms, by way of example only. The actuators may include cooling fans, power source switches, processor speed control, door latches, indicator lights, display panels, redundant module selection, and data link control by way of example only. The sensors and actuators are described in more detail with reference to FIGS. 2-4. HPM of each Fog node 12 may also include monitoring inventory of which modules are configured, the state of the modules, and managing the version levels and update process for firmware, software and field-programmable gate array (FPGA) configurations. If the HPM functions are not managed correctly, the performance, security, and reliability of the Fog nodes 12 may be compromised. Environment feedback elements and actuators are described in more detail with reference to FIGS. 2-4.

The internal environment feedback elements, actuators (including configuration states) of each Fog node 12 may be treated as a collection of Internet of Everything (IoE) elements, commonly known as things, associated with the Fog nodes 12 in an IoT network. This may bring many of the advantages of IoT networks, such as distributed control, analytics, better performance, improved reliability and security to the management to the hardware platform of individual Fog nodes 12. Treating the environment feedback elements and actuators of each Fog node 12 as IoE things may allow any Fog node 12 with appropriate security credentials to perform HPM tasks including monitoring, controlling and managing another Fog node's 12 HPM functions. Additionally, HPM actions may be based upon the collective intelligence of many Fog nodes 12 optionally in conjunction with the cloud computing environment 16, which leads to improved efficiency, faster configuration updates, and fault recovery advantages.

The HPM of each Fog node 12 may be distributed in arbitrary combinations of the Fog nodes 12 along N-S links 20 (where the Fog nodes 12 in higher layers control the HPM functions of the Fog nodes 12 nodes below them) or along E-W links 18 (where peer layer Fog nodes 12 control each other). The cloud computing environment 16 may also be involved, depending upon the specific security, performance and availability requirements of the situation. If one Fog node 12 has a partial failure (for example, because one of its processor modules goes down), it may be possible for other Fog nodes 12 to diagnose the problem remotely and modify the configuration of the broken Fog node 12 to bring the broken Fog node 12 back into service. By opening up HPM decisions to a wider network of Fog nodes 12, the Fog node network 10 as a whole can take trends like historic data, focused loads, or quickly-changing weather patterns into account as it performs its HPM operations. An orchestration service 30 may be implemented in order to provide orchestration services to the Fog nodes 12 and in particular with regard to the HPM of the Fog nodes 12 as described in more detail below. The orchestration service 30 may be implemented in one or more the Fog node 12 and/or the cloud computing environment.

Figure 2:
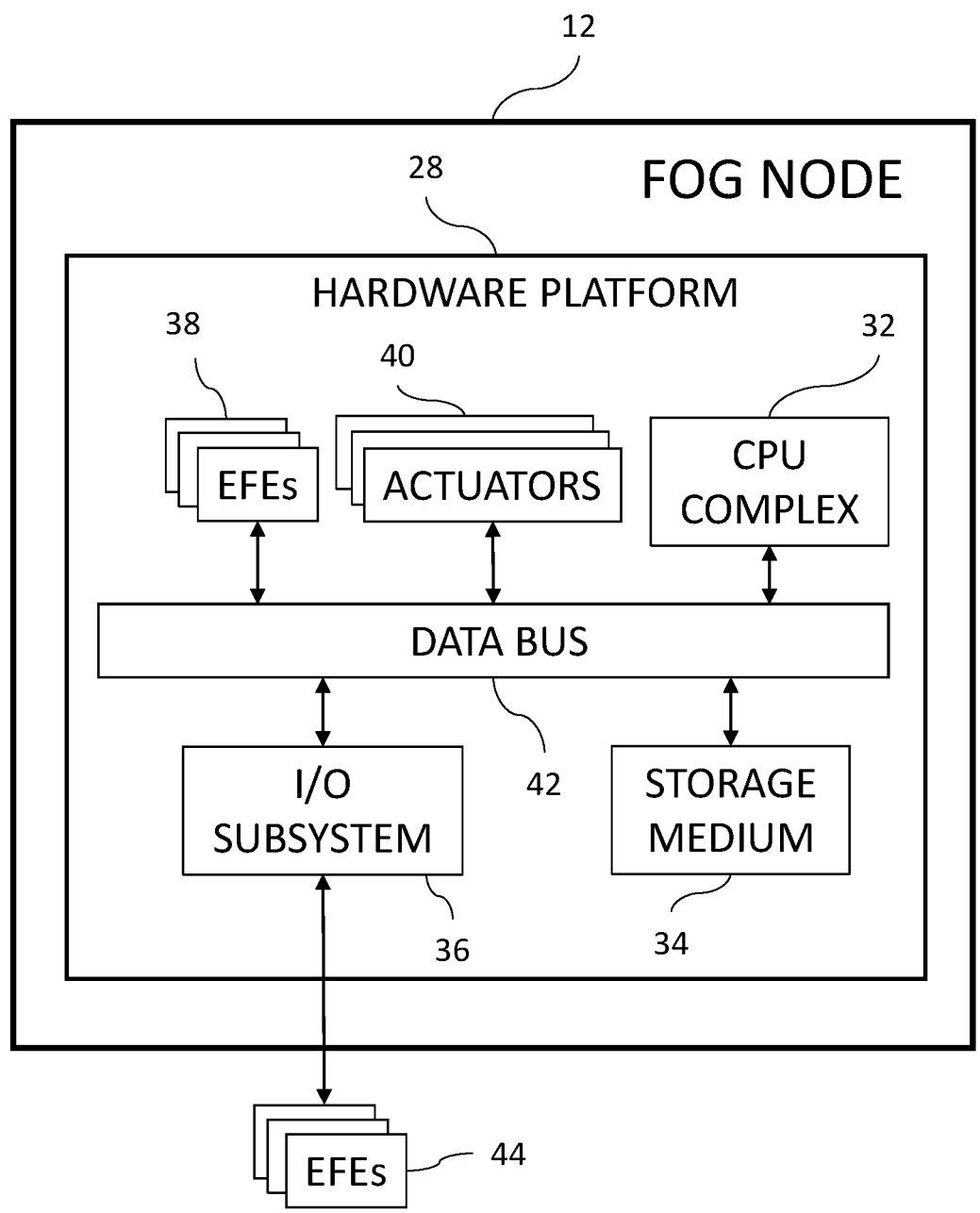
FIG. 2 is a block diagram view of a Fog node constructed and operative in accordance with an embodiment of the present disclosure.

Reference is now made to FIG. 2, which is a block diagram view of one of the Fog nodes 12 constructed and operative in accordance with an embodiment of the present disclosure. The present disclosure describes Fog nodes 12 in the Fog node network 10. However, it will be appreciated by one ordinarily skilled in the art that the HPM functionality of the Fog nodes 12 in the Fog node network 10 (FIG. 1) is not limited to Fog node 12 in the Fog node network 10, but may be implemented using any suitable set of network nodes in a suitable network.

Each Fog node 12 (only one shown in FIG. 2) has a hardware platform 28 which may include a central processing unit (CPU) complex 32, a storage medium 34, an input/output subsystem 36 to provide network processing and transport of data in a network with security features, a plurality of environment feedback elements (EFEs) 38 associated with that Fog node 12, a plurality of actuators 40 and a data bus 42 to provide a data connection among the elements of the hardware platform 28. Each fog node 12 may be directly connected to, and not via one or more Fog node 12, one or more external environment feedback elements (EFEs) 44 via the input/output subsystem 36.

The environment feedback elements 38, 44 may include one or more sensors. Some of the environment feedback elements 38, 44 may include sensors which measure one or more of the following: temperature, humidity, pressure, airflow, voltage, current, power supply parameters, fan speed, by way of example only. Some of the environment feedback elements 38, 44 may include sensors of user controls, like door open alarms, tamper detection, board latches, or reset buttons etc. Some of the environment feedback elements 38, 44 may include software sensors to measure or record non-physical parameters related to the computation, storage, networking status of the Fog node 12, such as CPU load, storage percent used, internet protocol (IP) network link occupancy, IP network link configuration, fault tolerance configuration, system errors like chip or link failures or storage capacity problems, local human-machine interface (HMI) inputs, storage limits, inventory etc. The environment feedback elements 38, 44 may be operative to sense, measure and/or record any suitable data that may be displayed on a gauge and/or on time series graph, by way of example only.

The actuators 40 may include any adjustable elements of the Fog node 12, for example, but not limited to, one or more of the following: fan operation and speed, power source selection and switches, processor speeds, door latches, indicator lights, display panels, redundant module selection, configuration control, diagnostic sequencing, link selection and speed control, I/O Interface selection, wireless channel selection, storage module selection, local HMI displays, processor speed control, reset, restart and other CPU, memory and display settings. The actuators 40 may control physical parameters and logical settings vital to the function of the Fog node 12.

Reference is now made to FIGS. 1 and 2. In operation, one of the Fog nodes 12, a Fog node 12(1) may periodically read data from its environment feedback elements 38, 44, and the CPU complex 32 of the Fog node 12(1) may process the data readings from the environment feedback elements 38, 44, distill trends from the data readings and derive recommended HPM actions. Alternatively or additionally, the Fog node 12(1) may prepare all, or a subset (possibly the most critical subset), of the readings of the environment feedback elements 38, 44, for transport and send the readings to a peer Fog node 12 such as Fog node 12(2) and also to a higher order Fog Node 12, such as Fog node 12(3) or any suitable number and combination of Fog nodes 12.

Some control decisions that the Fog node 12(1) makes before it drives commands down to its actuators 40 may advantageously use a broader system view from other Fog nodes 12 in the Fog node network 10. The CPU complexes 32 in the Fog nodes 12(2) and 12(3) may also consider the readings (or a subset thereof) of the environment feedback elements 38, 44 of the Fog node 12(1) and independently calculate HPM decisions (control actions) for the actuators 40 of Fog node 12(1) based upon the wider context of the Fog nodes 12(2) and 12(3) which may include readings from environment feedback elements 38, 44 of the Fog nodes 12(2) and 12(3) as well as other Fog nodes 12 in additional to, or instead of, the readings from environment feedback elements 38, 44 of the Fog node 12(1). Additionally, processing errors of the Fog node 12(1) are typically not repeated by other Fog nodes 12. The HPM decisions may be packaged up as Internet packets by the Fog nodes 12(2) and 12(3) and sent back to the Fog node 12(1). Software on the CPU complex 32 of the Fog node 12(1) reconciles all local and remote HPM decision, optionally using a majority or weighted voting scheme yielding an HPM proposed action, and performs the resulting proposed action(s) on the actuators 40 which may include performing the proposed action(s) on the CPU complex 32, storage medium 34 and/or the input/output subsystem 36. It should be noted that Fog nodes 12(2) and 12(3) may receive the readings from the environment feedback elements 38, 44 of the Fog node 12(1) based on any suitable model, for example, but not limited to, push, pull, publish and subscribe or limit based interrupt models. So for example, the Fog nodes 12(2) and 12(3) may retrieve the readings from the environment feedback elements 38, 44 of the Fog node 12(1), for example based on instructions received from the Fog node 12(1) or from the orchestration service 30, by way of example only, and then the Fog nodes 12(2) and 12(3) may determine the HPM decisions for the Fog node 12(1) based on the retrieved readings. It should be noted that the Fog nodes 12(2) and (3) have been chosen by way of example only, and that the HPM decisions may be made by any suitable combination, and any suitable number, of Fog nodes 12 from any of the layers of the Fog node network 10. The combination and number of the Fog nodes 12 used to make decisions for any other Fog node 12 may be dynamic. The decision of which Fog node 12 should make an HPM decision for another Fog node 12 may made by the orchestration service 30 and/or the Fog node 12 requesting the HPM decisions. The orchestration service 30 may use an operational plan to determine which Fog nodes 12 are involved in cooperating to make HPM decisions for the Fog node 12(1). The plan may be configured at system commissioning time, or may be calculated dynamically based upon current configuration state, loads on the Fog nodes 12 and links, fault tolerance events, or history, by way of example only. The orchestration service 30 is operative to ensure that the HPM operations of the Fog nodes 12 are collectively optimized.

The above distributed scheme permits global optimization of the HPM behavior of the Fog nodes 12. For example, if some extraordinary event (storm, power failure, disaster, hacker attack etc.) impacts a specific Fog Node 12, the neighbors of that Fog node 12 and the Fog nodes 12 in higher hierarchical layers of the Fog node network 10 all the way up to the cloud computing environment 16 may use their potentially safer location and broader context of the total state of the IoT network to help that impacted Fog node 12 make better decisions on modifying its hardware platform configuration.

Fault tolerance and security are enhanced in highly critical Fog networks too, as multiple commands from multiple Fog nodes 12 may be compared, and only acted upon if the criteria for consensus is met. Under this scheme, a hardware failure or hacker compromising a single Fog Node 12 may not be able to reconfigure that Fog node 12 or any other Fog node 12 in the Fog node network 10.

The fault tolerance may be further extended to detect potential failure or unacceptable tolerance within environment feedback elements 38, 44. If a plurality of the Fog nodes 12 detect a specific condition (e.g., a number of geographically co-located Fog nodes 12 detect temperature at a similar value), but one Fog node's 12 reading is out of an acceptable range, the relevant environment feedback element 38 of the Fog node 12 with the out-of-range reading may be marked as having a potential issue even though it may not have failed entirely.

Some diagnostic operations are invasive, for example, but not limited to, Joint Test Action Group (JTAG) scans and multi-pass memory tests, and so may not be performed in cloud data centers. The distributed environment of the Fog nodes 12 may enable moving workloads to other Fog Nodes 12 temporarily to perform such diagnostic operations periodically as part of the HPM decision making. To take better advantage of distributed, geographically aware HPM, the Fog nodes 12 typically interact with the orchestration service 30 to reroute networks, relocate applications, learn network topology and geography, etc. The orchestration service 30 is described in more detail with reference to FIGS. 3 and 4. The sharing of the data from the environment feedback elements 38, 44 typically conforms to certain security, privacy, consistency and persistence requirements determined on an implementation specific basis.

Multi-node trends may also be considered across the Fog node network 10 as part of the HPM decisions. For example, as multiple Fog nodes 12 along a geographical line begin to encounter severe weather based on their sensor readings, one or more of the multiple Fog nodes 12 may alert Fog nodes 12 further down the path that a storm is approaching. If the downstream Fog nodes 12 have weather hardening capabilities (e.g., slats that can be moved to provide additional protection or allow for cooling) the weather hardening capabilities may be deployed proactively to prevent potential storm damage to the downstream Fog nodes 12.

There may also be a potential performance advantage. Some HPM operations are computationally complex, and if multiple Fog Nodes 12 share the load then latency, reconfiguration time and fault recovery time for the entire Fog node network 10 may be improved.

Figure 3:
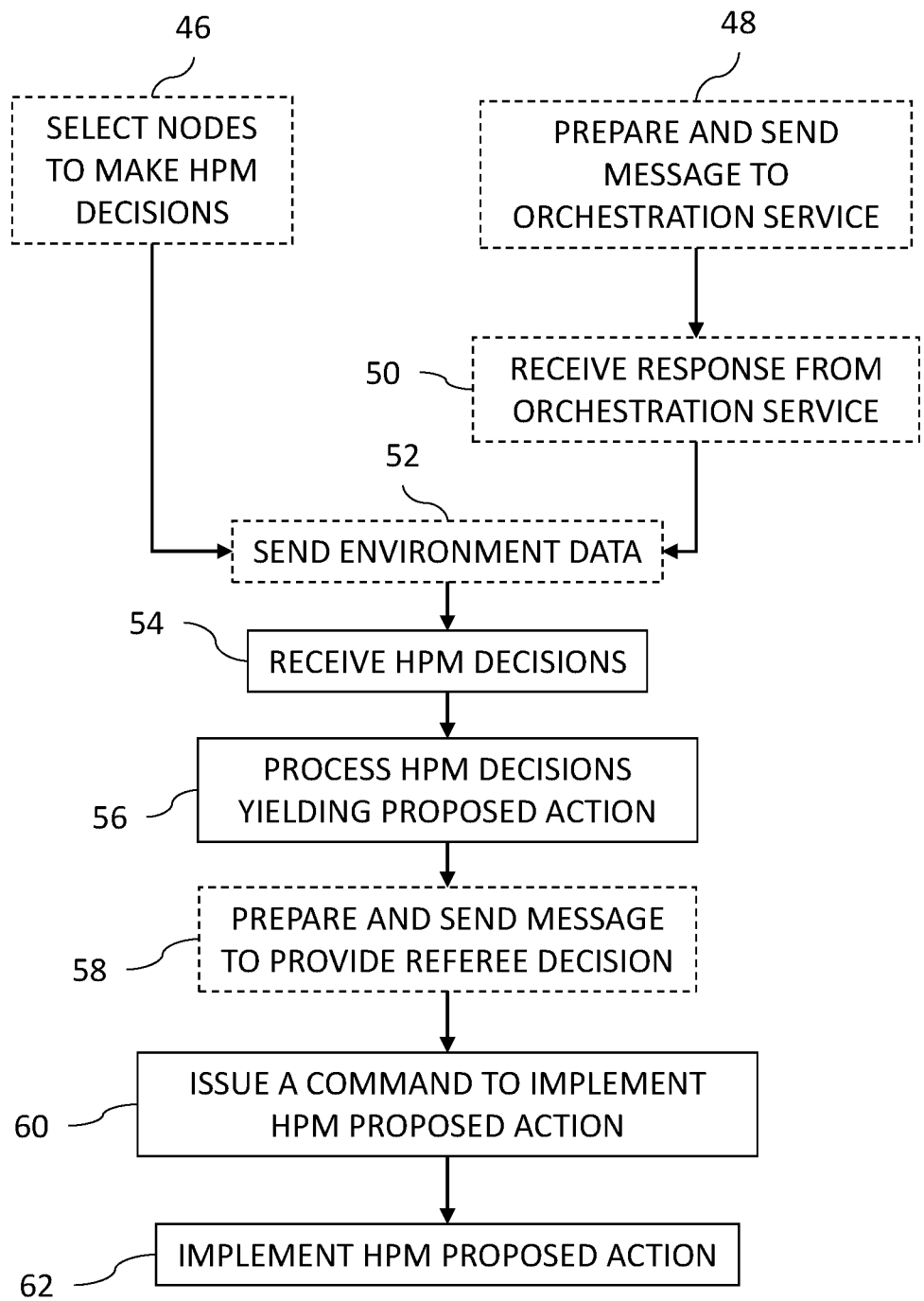
FIG. 3 is a flow chart showing exemplary steps in a mode of operation of the Fog node of FIG. 2.

Reference is now made to FIG. 3, which is a flow chart showing exemplary steps in a mode of operation of the Fog node 12(1) of FIGS. 1 and 2. The CPU complex 32 (FIG. 2) of the Fog node 12(1) is operative to select different Fog nodes 12 from a selection of Fog nodes 12 to make a plurality of HPM decisions (block 46). The selection may be based on the type of hardware platform issue to be resolved, geographic locations of the Fog nodes 12, network topology and expected occupancy levels of data links 18, 20, 22, 26 (FIG. 1), processor loads and storage capacities of individual Fog nodes 12, and network operational policies, by way of example only.

The selection may be performed by the Fog node 12(1) alone or in conjunction with the orchestration service 30 (FIG. 1) as will now be described below. The CPU complex 32 (FIG. 2) of the Fog node 12(1) is operative to prepare a message for sending by the input/output subsystem 36 (FIG. 2) of the Fog node 12(1) to the orchestration service 30 to select the different Fog nodes 12 from a selection of Fog nodes 12 in the Fog node network 10 to make the HPM decisions (block 48). The CPU complex 32 of the Fog node 12(1) is operative to receive a response from the orchestration service 30, via the input/output subsystem 36 of the Fog node 12(1), listing the different Fog nodes 12 to make the HPM decisions (block 50).

The input/output subsystem 36 (FIG. 2) is operative to send environment data from the environment feedback elements 38, 44 (FIG. 2) of the Fog node 12(1) for receipt by the different Fog nodes 12 to determine the HPM decisions based on the environment data from the environment feedback elements 38, 44 of the Fog node 12(1) and/or environment data from the environment feedback elements 38, 44 of one or more other Fog nodes 12, for example, the environment feedback elements 38, 44 of the Fog node 12 making the HPM decision (block 52). One or more of the steps 46-52 (shown with dotted line boxes) are optional in that the different Fog nodes 12 may receive the readings from the environment feedback elements 38, 44 of the Fog node 12(1) based on any suitable model, for example, but not limited to, push, pull, publish and subscribe or limit based interrupt models. So for example, the Fog nodes 12(2) and 12(3) may retrieve the readings from the environment feedback elements 38, 44 of the Fog node 12(1), for example based on instructions received from the Fog node 12(1) or from instructions received from the orchestration service 30 (FIG. 1), by way of example only, and then the Fog nodes 12(2) and 12(3) may determine the HPM decisions for the Fog node 12(1) based on the retrieved readings.

The different Fog nodes 12 determine the HPM decisions based on environment data from the environment feedback elements 38, 44 (FIG. 2) distributed in the Fog node network 10 (FIG. 1). The environment data may be derived from the environment feedback elements 38, 44 directly connected to, or included in, the Fog node 12(1) and/or the environment feedback elements 38, 44 directly connected to, or included in, one or more of the different Fog nodes 12 determining the HPM decisions for the Fog node 12(1).

The CPU complex 32 of the Fog node 12(1) is operative to receive the HPM decisions from the different Fog nodes 12 (block 54) via the input/output subsystem 36. The HPM decisions received from the different Fog nodes 12 may include at least two different HPM decisions. In other words the different Fog nodes 12 may or may not determine different HPM decisions for the Fog node 12(1). The different decisions may result from the different Fog nodes 12 using different environment data or result from the different Fog nodes 12 performing different portions of the overall HPM issue(s) for the Fog node 12(1). Alternatively, if one of the different Fog nodes 12 is not functioning correctly, a different decision may result even from the same environment data and even for the same HPM issue(s).

The CPU complex 32 (FIG. 2) of the Fog node 12(1) is operative to process the received HPM decisions to yield an HPM proposed action or actions (block 56). The CPU complex 32 of the Fog node 12(1) may be operative to apply a majority rule decision to the received HPM decisions to yield the HPM proposed action decision. When the different Fog nodes 12 perform different portions of the decision of the overall HPM issue(s) for the Fog node 12(1), the CPU complex 32 of the Fog node 12(1) may be operative to combine the different HPM decisions to yield the HPM proposed action based on how the HPM issue was divided among the different Fog nodes 12. The Orchestration system 30 may assign weights that the CPU complex 32 applies to the received HPM decisions while calculating the HPM proposed action. The HPM proposed action may include performing any suitable action with one or more of the actuators 40 of the Fog node 12(1), for example, but not limited to: changing a cooling system setting of the hardware platform 28 (FIG. 2); allocating a network bandwidth setting of the hardware platform 28; and saving computer program state data stored in the storage medium 34 (FIG. 2) to a remote storage device such as in the cloud computing environment 16 or in another Fog node 12 (for example, in response to a detected weather pattern upstream).

Optionally, the CPU complex 32 of the Fog node 12(1) is operative to prepare a message for sending by the input/output subsystem 36 (FIG. 2) to a processing service, for example, one or more other Fog nodes 12 and/or the cloud computing environment 16 (FIG. 1) requesting the processing service to provide a referee decision between the different HPM decisions (block 58). The referee processing may be particularly useful when there is a tie between the different HPM decisions.

The CPU complex 32 of the Fog node 12(1) is operative to issue a command to implement the HPM proposed action in the hardware platform 28 (FIG. 2) (block 60). The hardware platform 28 is operative to implement the HPM proposed action (block 62) by operating the appropriate actuator(s) 40 (FIG. 2).

Figure 4:
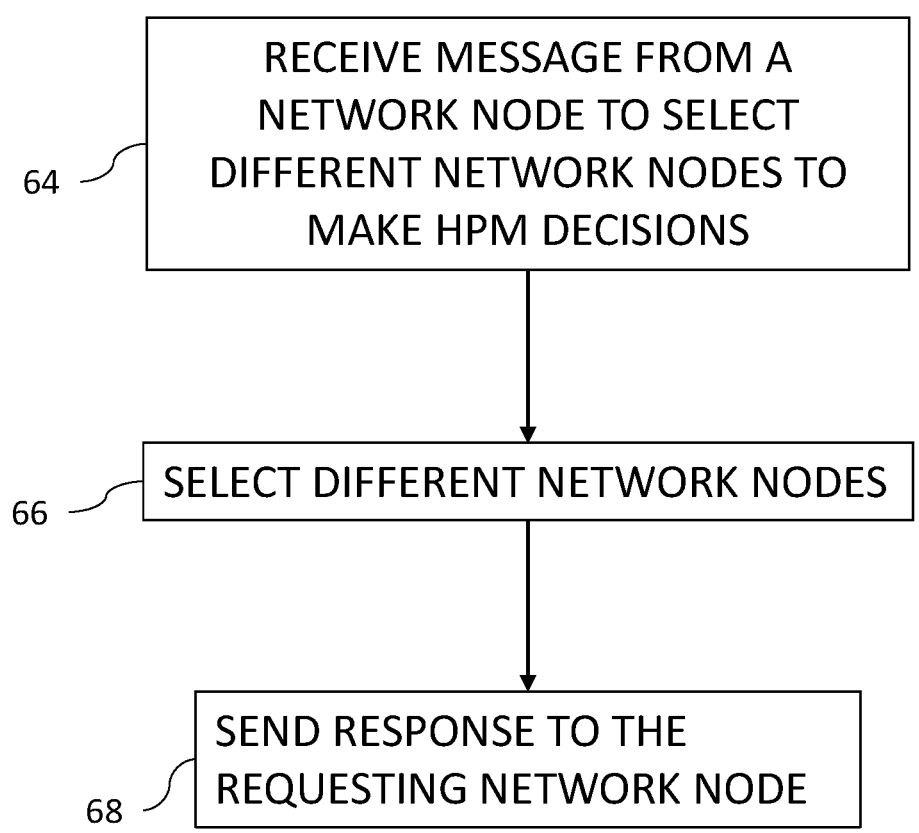
FIG. 4 is a flow chart showing exemplary steps in a mode of operation of an orchestration service in the Fog Node network of FIG. 1.

Reference is again made to FIG. 1. Reference is also made to FIG. 4, which is a flow chart showing exemplary steps in a mode of operation of the orchestration service 30 in the Fog Node network 10. The orchestration service 30 is operative to receive a message, from Fog node 12(1) in the Fog node network 10, to select different Fog nodes 12 from a selection of Fog nodes 12 in the Fog node network 10 to make HPM decisions (block 64). The orchestration service 30 is operative to selecting the different Fog nodes 12 from the selection of Fog nodes 12 to make the HPM decisions (block 66). The selecting may be performed based on a type of hardware platform issue to be resolved, geographic locations of the Fog nodes 12, network topology and expected occupancy levels of data links 18, 20, 22, 26, processor loads and storage capacities of individual Fog nodes 12, and network operational policies, by way of example only. The orchestration service 30 is operative to send a response to the Fog node 12(1), the response listing the different Fog nodes 12 selected to make the HPM decisions (block 68).

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A network node device comprising:
   a hardware platform including a central processing unit (CPU) complex, a storage medium and an input/output subsystem to provide network processing and transport of data in a network, the CPU complex being operative to:
   receive a plurality of hardware platform management decisions from a plurality of different fog nodes in the network via the input/output subsystem, each one of the plurality of different fog nodes deciding one of the plurality of hardware platform management decisions;
   based on the hardware platform management decisions received from the plurality of different fog nodes, apply a voting scheme to the received hardware platform management decisions to yield a hardware platform management proposed action; and
   issue a command to implement the hardware platform management proposed action in the hardware platform, wherein the hardware platform is operative to implement the hardware platform management proposed action.

2. The device according to claim 1, wherein the hardware management proposed action includes changing a cooling system setting of the hardware platform.

3. The device according to claim 1, wherein the hardware management proposed action includes allocating a network bandwidth setting of the hardware platform.

4. The device according to claim 1, wherein the hardware management proposed action includes saving state data stored in the storage medium to a remote storage device.

5. The device according to claim 1, wherein the hardware platform also includes a plurality of actuators, wherein the hardware management proposed action includes performing an action with at least one of the plurality of actuators.

6. The device according to claim 1, wherein the plurality of different fog nodes determine the hardware platform management decisions based on environment data from a plurality of environment feedback elements distributed in the network.

7. The device according to claim 6, further comprising the plurality of environment feedback elements.

8. The device according to claim 7, wherein the plurality of environment feedback elements include a sensor.

9. The device according to claim 7, wherein the input/output subsystem is operative to send the environment data for receipt by the plurality of different fog nodes to determine the hardware platform management decisions at least based on the environment data.

10. The device according to claim 6, wherein the environment data is based on environment feedback elements of one or more of the different fog nodes determining the hardware platform management decisions for the network node device.

11. The device according to claim 1, where the plurality of hardware platform management decisions received from the plurality of different fog nodes in the network include at least two different hardware platform management decisions.

12. The device according to claim 11, wherein the voting scheme comprises a majority rule voting scheme or a weighting voting scheme.

13. The device according to claim 11, wherein the CPU complex is operative to prepare a message for sending by the input/output subsystem to a processing service requesting the processing service to provide a referee decision between the at least two different hardware platform management decisions.

14. The device according to claim 11, wherein the CPU complex is operative to select the plurality of different fog nodes from a selection of network nodes to make the plurality of hardware platform management decisions based on at least one of the following: a type of hardware platform issue to be resolved, geographic locations of the plurality of different fog nodes, a network topology and expected occupancy levels of data links, processor loads and storage capacities of the plurality of different fog nodes and network operational policies.

15. The device according to claim 11, wherein the CPU complex is operative to prepare a message for sending by the input/output subsystem to an orchestration service to select the plurality of different fog nodes from a selection of fog nodes to make the plurality of hardware platform management decisions.

16. The device according to claim 15, wherein the CPU complex is operative to receive a response from the orchestration service listing the plurality of different fog nodes.

17. A method comprising:
receiving a plurality of hardware platform management decisions from a plurality of different fog nodes in a network, each one of the plurality of different fog nodes deciding one of the plurality of hardware platform management decisions;
based on the hardware platform management decisions received from the plurality of different fog nodes, applying a voting scheme to sing the received hardware platform management decisions to yield a hardware platform management proposed action;
issuing a command to implement the hardware platform management proposed action in a hardware platform, the hardware platform including a central processing unit (CPU) complex, a storage medium and an input/output subsystem to provide network processing and transport of data in the network; and
implementing the hardware platform management proposed action in the hardware platform.

18. The method according to claim 17, where the plurality of hardware platform management decisions received from the plurality of different fog nodes in the network include at least two different hardware platform management decisions.

* * * * *

UNITED STATES PATENT AND TRADEMARK OFFICE
CERTIFICATE OF CORRECTION

PATENT NO. : 10,616,052 B2
APPLICATION NO. : 15/050485
DATED : April 7, 2020
INVENTOR(S) : Byers et al.

It is certified that error appears in the above-identified patent and that said Letters Patent is hereby corrected as shown below:

In the Specification

Column 10, Line 27 should read:
applying a voting scheme to the received hardware Signed and Sealed this
Twenty-eighth Day of July, 2020

Andrei Iancu
*Director of the United States Patent and Trademark Office*